United States Patent [19]
Takizawa

[11] Patent Number: 4,794,448
[45] Date of Patent: Dec. 27, 1988

[54] SOLID-STATE COLOR IMAGING APPARATUS FOR PREVENTING COLOR ALIAS

[75] Inventor: Yoshinori Takizawa, Tokyo, Japan

[73] Assignee: Kabushiki Kaisha Toshiba, Kawasaki, Japan

[21] Appl. No.: 711,761

[22] Filed: Mar. 14, 1985

[30] Foreign Application Priority Data

Mar. 16, 1984 [JP] Japan ................................. 59-50622

[51] Int. Cl.⁴ ....................... H04N 9/077; H04N 9/73
[52] U.S. Cl. ....................................... 358/44; 358/29; 358/48
[58] Field of Search ................... 358/29, 29 C, 41, 43, 358/44, 48

[56] References Cited

U.S. PATENT DOCUMENTS

| | | | |
|---|---|---|---|
| 4,368,482 | 1/1983 | Machida et al. | 358/29 C |
| 4,381,520 | 4/1983 | Machida et al. | 358/29 C |
| 4,460,919 | 7/1984 | Takemura | 358/44 |
| 4,467,347 | 8/1984 | Ozawa et al. | 358/48 |
| 4,570,178 | 2/1986 | Murimura et al. | 358/44 |
| 4,620,222 | 10/1986 | Baba et al. | 358/48 |
| 4,688,085 | 8/1987 | Imaide | 358/44 |
| 4,714,955 | 12/1987 | Nishimura et al. | 358/48 |

FOREIGN PATENT DOCUMENTS

| | | | |
|---|---|---|---|
| 0057923 | 8/1982 | European Pat. Off. | |
| 2464611 | 3/1981 | France | |
| 2483719 | 12/1981 | France | |
| 58-50881 | 3/1983 | Japan | 358/48 |
| 58-143675 | 8/1983 | Japan | 358/48 |
| 59-13487 | 1/1984 | Japan | 358/48 |
| 59-11088 | 1/1984 | Japan | 358/44 |
| 59-25490 | 2/1984 | Japan | 358/48 |
| 59-108491 | 6/1984 | Japan | 358/48 |
| 59-153391 | 9/1984 | Japan | 358/29 |
| 59-154891 | 9/1984 | Japan | 358/48 |
| 59-171382 | 9/1984 | Japan | 358/48 |

Primary Examiner—James J. Groody
Assistant Examiner—Randall S. Svihla
Attorney, Agent, or Firm—Cushman, Darby & Cushman

[57] ABSTRACT

A color solid-state imaging apparatus includes a color solid-state image sensor that produces a color image output signal. This output signal includes horizontal scanning line signals. Different signals are produced by amplifying the levels of these horizontal scanning line signals by different amounts. By substracting the amplified signals, a difference signal can be produced. The amount of amplification is adjusted such that this difference signal is zero when the solid-state image sensor is detecting an image of a predetermined color.

8 Claims, 3 Drawing Sheets

FIG. 1

SOLID-STATE COLOR IMAGING APPARATUS FOR PREVENTING COLOR ALIAS

BACKGROUND OF THE INVENTION

Field of the Invention

The present invention relates to a solid-state color imaging apparatus arranged to obtain a color television signal by the use of a solid-state image sensor such as a CCD (Charge Coupled Device) or a MOS type color image sensor.

Various types of solid-state color image sensors each combined with a color filter have hitherto been developed. The output signals of the solid-state color image sensor include luminance information and chrominance information. The former information is obtained by passing the output signal of the solid-state color image sensor through a low-pass filter, and is used as a luminance signal (Y). The latter information, the chrominance is obtained by passing the output signal from the solid-state color image sensor through a band-pass filter. This latter information, i.e., chrominance information, is separated into red information and blue information, by a separating means. This separating means includes a one horizontal line period (hereinafter, referred to simply as 1-H) delay circuit, an adder, and a subtractor. In the adder non-delay chrominance information constituting an output of the band-pass filter and delay chrominance information constituting an output of the 1-H delay circuit are added together, whereby red information is obtained from this adder. On the other hand, in the subtractor, subtraction is performed between the non-delay chrominance information and the delay chrominance information. Blue information is obtained from this subtractor. The red and blue information are subjected to detection by a detector, to become a red signal (R) and a blue signal (B), respectively. The red signal (R), blue signal (B), and luminance signal (Y) are inputted into an encoder, in which a color video signal is composed with the use of these input signals.

In order to obtain a color signal from the output signal of the solid-state color image sensor in the above-mentioned way, it is necessary to perform an operation between the chrominance information of one horizontal line and that of another horizontal line which is adjacent thereto. That is to say, the red signal (R) and the blue signal (B) are obtained using vertical correlation between the two adjacent horizontal lines. Accordingly, a means for performing said operation generates a color alias with respect to that portion of the foreground to be picked up which has no vertical correlation. Namely, a conventional color signal separation circuit carries out its operation based on the assumption that a vertical correlation exists between the colors and brightness of the foreground. When the foreground contains a portion where no vertical correlation exists between its color and that of the background (i.e. when the color and/or brightness of that particular portion of the foreground are in sharp contrast with the color and/or brightness of the background) the video images of the foreground and background contain a color alias at their boundaries.

Further, as mentioned above, the conventional circuit is arranged so that the red information and blue information are subjected to detection by a detector, to become a red signal (R) and a blue signal (B), respectively, which are inputted into the encoder. In the encoder, the red signal (R) and the blue signal (B) are matrixed, whereby a green signal (G) is prepared. In the encoder, thereafter, the red signal (R), blue signal (B), green signal (G), and luminance signal (Y) are composed. According to circumstance, in order to simplify the circuit, the red signal (R), the blue signal (B) and the luminance signal (Y) may be directly used for obtaining the TV iignal without the green signal being made. In such cases, the linearity of the signals are important factors in determining the white tracking, white balance, and hue correction of the picture. However, since the conventional color signal separation circuit is such that the blue information and red information are subjected to AM detection, where a signal having a low brightness level in particular is processed, the white balance deteriorates because the linearity of the detector circuit (diode detector circuit) is bad. That is, it is difficult to obtain a uniform white balance from high to low illumination portions of a subject. Further, for the R, G, B and Y signals, corresponding to signals (which are obtained through filters having good spectrum sensitivity), a color adjustment circuit is provided in many cases. The color adjustment circuit use the R, G, B and Y signals in its calculations. However, the white balance deteriorates because the signal ratio is hhanged by the calculations. Further, if all combinations between R, G, B and Y signals are calculated, the calculation circuit becomes complicated and the adjustment is complex. For this reason, the adjustment can not be achieved in a limited adjusting width.

SUMMARY OF THE INVENTION

The present invention has been made in view of the above-mentioned circumstances and its object is to provide a solid-state color imaging apparatus which is capable of eliminating the color alias, thereby improving the quality of the picture.

Another object of the present invention is to provide a solid-state color imaging apparatus which permits the white balance to be stably maintained in the picture and which makes it possible to easily adjust the hue correction.

In order to achieve the above objects, the present invention provides a solid-state color imaging apparatus comprising: a solid-state color image sensor intended for outputting color image information, and a color signal information processing means, intended for obtaining first and second difference signals. The solid state color image sensor has a color filter in which the first and second horizontal scanning picture element array are alternately set in the vertical direction. First and second color signal information is obtained from the first horizontal scanning picture element array, and third and fourth color signal information is obtained from the second horizontal scanning picture element array. The color signal information processing means includes; a separating means coupled to the solid-state color image sensor which is intended to separate the first, second, third and fourth color signal information pieces, an amplifying means in which said four color signal information pieces are grouped into two sets each consisting of two arbitrarily selected color signal information pieces, and in which the gains of the respective color signal information pieces constituting each set are so set that when a foreground portion having one color is photographed, the first difference signal (which indicates the difference between the color signal information pieces constituting a first set of said two sets), and the second difference signal (which indicates the difference between the color signal information pieces constituting a second set of said two sets), may be zero. It also has subtracting means to which are inputted thsse signals from the amplifying means which are subjected to gain control.

DETAILED DESCRIPTION OF THE PREFERRED EMBODIMENTS

Figure 1:
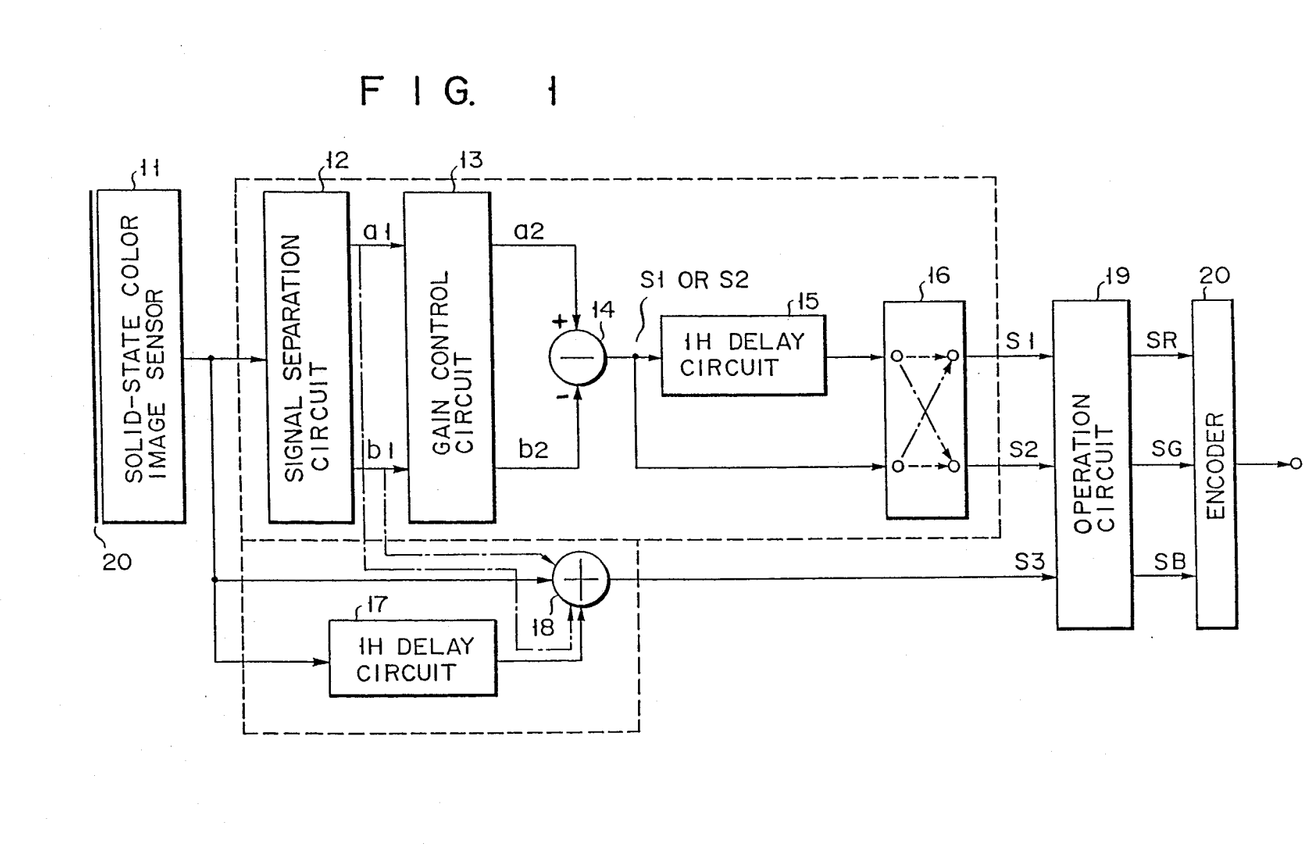
FIG. 1 shows the construction of a solid-state color imaging apparatus according to an embodiment of the presen invention.

FIG. 1 shows a solid-state color imaging apparatus according to an embodiment of the present invention. A solid-state color image sensor 11 has a color filter array 20 shown in FIG. 2 with respect to its picture elements. In the color filter array 20, W, G, Ye, and Cy represent the following filter portions, respectively.

Figure 2:
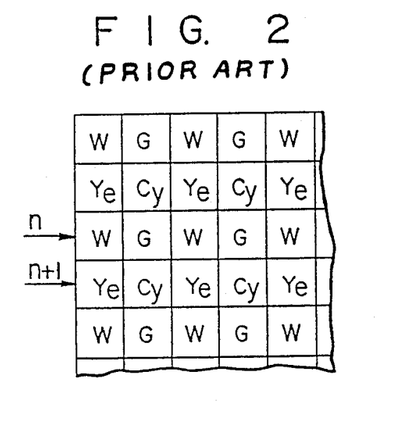
FIG. 2 is a view for explaining a color filter array provided in a solid-state color image sensor used in the present invention.

W ... white color light transmission filter portion,
G ... green color light transmission filter portion,
Ye ... yellow color light transmission filter portion, and, Cy ... cyan color light transmission filter portion.

The filter portions W, G, Ye, and Cy correspond to the picture elements which constitute photoelectric conversion elements.

The output signal of the solid-state colo image sensor 11 is inputted into a one horizontal line period delay circuit 17 and an adder 18, which together constitute a composing means, and also inputted into a signal separation circuit 12. The adder 18 adds the output signal of the solid-state color image sensor 11 to the output signal of the 1-H delay circuit 17. Assuming now that the output signal of the adder 18 is S3, $$S3 = Ws + Gs + Ys + Cs \quad (1)$$
$$= 2R + 4G + 2B$$

The S3 indicates a fundamental composite signal for demodulating the R, G and B signals at an aftermentioned operation circuit 19. In the above formula (1), the Ws, Gs, Ys, and Cs represent the following signal amounts.

Ws=white signal amount (=R+G+B)
Gs=green signal amount (=G)
Ys=yellow signal amount (=R+G), and
Cs=cyan signal amount (=G+B) 5
Letters R, G, and B represent the red, green and blue signal amounts, respectively, which are contained in the output signals of the picture elements. The signal separation circuit 12 can be constituted, for example, by a sample and hold circuit or a gate circuit.

The signal separation circuit 12 separates the output signal from the solid-state color image sensor with respect to each individual picture element. That is to say, with respect to the nth line, the circuit 12 separates the output signal Ws of the picture element corresponding to th whole color light transmission filter portion (W) and the output signal Gs of the picture element corresponding to the green color light transmission filter portion (G). With respect to the (n+1)th line, the circuit 12 separates the output signal Ys of the picture element corresponding to the yellow color light transmission filter portion (Ye) and the output signal Cs of the picture element corresponding to the cyan color light transmission filter portion (Cy). Namely, with respect to the nth line, the signals:

$$\begin{aligned} a1 &= Ws = R + G + B \\ b1 &= Gs = G \end{aligned} \quad (2)$$

are obtained from the signal separation circuit 12. With respect to the (n+1)th line, the signals:

$$\begin{aligned} a1 &= Ys = R + G \\ b1 &= Cs = G + B \end{aligned} \quad (3)$$

are obtained from this circuit 12.

The signals (a1) and (b1) of the above formula (2) or (3) which have thus been obtained from the signal separation circuit 12 are inputted into a gain control circuit 13. This gain control circuit 13 gain-controls one or both of the two input signals (a1) and (b1) and produces the two gain-controlled output signals (a2) and (b2) which are inputted into a subtractor 14. In the gain control circuit 13, gain control is previously made so that the difference between the output signals (a2) and (b2), when an image having some color is picked up by the image sensor, is zero. The "image having some color" is nne having a white (achromatic) color, for example.

Accordingly, when the white object has been imaged on the entire screen of the solid-state image sensor 11, gain control is made such that a2 (Ws)=b2 (Gs) with respect to the nth line; and a2 (Ys)=b2 (Cs) with respect to the (n+1)th line, by previously rearranging the characteristic of the gain control circuit 13. In these formulae, the symbols parenthesized indicate the filter portions corresponding to the output signals a2 and b2, respectively. The gain control circuit 13 contains a first amplifier for amplifying the signal (a1) and a second amplifier for amplifying the signal (b1), the gain of said second amplifier being changed over to $\alpha$ or $\beta$ with respect to each horizontal line so as to cause the formulae (6) and (7), as later described, to be established. The gain control circuit 13 may contain a first amplifier for amplifying the signal (a1) and second and third amplifiers for amplifying the signal (b1). In this case, the second and third amplifiers have their gains set to $\alpha$ and $\beta$ respcctively, as later described, and (with respect to the nth line) the output of the second amplifier is drawn out by a switch while (with respect to the (n+1)th line) the output of the third amplifier is drawn out by a switch.

Assume now that the entire screen of the solid-state image sensor is photographed with a white colored image and that the signal amounts contained in the output signals of the picture elements are represented by Ws(wh), Gs(wh), Ys(wh), and Cs(wh). At this time, the two output signals a2 and b2 of the gain control circuit 13 are expressed as follows: with respect to the nth line, $$Ws \brace Gs \cdot \frac{Ws(wh)}{Gs(wh)}} \quad (4)$$

(the reference signal is Ws); and with respect to the (n+1)th line, $$Ys \brace Cs \cdot \frac{Ys(wh)}{Cs(wh)}} \quad (5)$$

(the reference signal is Ys). Hereinafter, for simplification, $$\frac{Ws(wh)}{Gs(wh)} = \alpha$$

$$\frac{Ys(wh)}{Cs(wh)} = \beta$$

Assume now that the difference signal of the subtractor 14 obtained with respect to the nth line is S1 while the difference signal of the subtractor 14 obtained with respect to the (n+1)th line is S2. Then, these difference signals S1 and S2 are expressed as follows. Namely, $$S1 = Ws - \alpha Gs \ldots \quad (6)$$

$$S2 = Ys - \beta Cs \ldots \quad (7)$$

Accordingly, from the subtractor 14, the signal S1 or S2 is alternately obtained with respect to each horizontal line.

The color signals R, G and B are prepared with the use of the above-mentioned signals S1 and S2 and the above-mentioned signal S3 from the adder 18. However, since the signal S1 or S2 is alternately obtained with respect to each line, these signals S1 and S2 are required to be synchronized with each other so as to be simultaneously inputted into specified terminals of an operation circuit 19 with respect to whatever line on which the scanning operation is being performed. The means whereby suc synchronization is performed is a one horizontal line period delay circuit 15 and a one horizontal line period changing over switch 16. That is to say, the output signal from the subtractor 14 is inputted into one input terminal of the 1-H changing over switch 16 as well as into the 1-H delay circuit 15. To the other input terminal of the 1-H changing over switch 16 is inputted an output signal from the 1-H delay circuit 15. The 1-H changing over switch 16 has an output terminal for the signal S1 and an output terminal for the signal S2. Its input signal is alternately changed over to a mode shown in FIG. 1 by a broken line, or a second mode shown in FIG. 1 by a one-dot chain line, with respect to each scanning line. Thus, the signals S1 and S2 are synchronized and then inputted into the operation circuit 19. For example, a horizontal synchronizing pulse which is used to drive the color image sensor 11 is used as a control signal for controlling the 1-H changing over switch 16. Thus, the signals S1, S2 and S3 are inputted into the operation circuit 19.

Preparing the signal S3 is possible without using the 1-H delay circuit 17. In this case, the line from the solid-state image sensor to the 1-H delay circuit 17 and the adder 18 is cut off, then the signals S1, S2 are inputted into the adder 18 as shown FIG. 1 by one-dot chain lines.

That is, it is also possible to prepare the signal S3 with the use of the not gain-controlled signals a1 and b1 which constitute the output signals of the sample and hold circuit 12. In this case, with respect to the nth line, $$S3 = Ws + Gs = R + 2G + B \ldots \quad (8)$$

and, with respect to the (n+1)th line, $$S3 = Ys + Cs = R + 2G + B \ldots \quad (9).$$

Another way of preparing the signal S3 is possible without using the 1-H delay circuit 17 and the adder 18. In this case, the output signal from the solid-state image sensor is used, as it is, as the signal S3. The signal S3 can be disclosed by the formulas (8), (9).

The color signal information processing circuit which is enclosed by a broken line of FIG. 1, and which has been explained above, effectively works to prevent the generation of a color alias. That is to say, in the gain control circuit 13, the gains $\alpha$ and $\beta$ of the amplifiers which have previously been explained in connection with the formulas (4) to (7) are controlled. Namely, the gain control circuit 13 is so set that when the screen of the sensor 11 obtains an image which is a white-colored image, $Ws = \alpha Gs$ and $Ys = \beta Cs$ with the result that the difference signals S1 and S2 are zero. These difference signals S1 and S2 are prepared from the output signals obtained by scanning a single horizontal line. At the stage where the signals S1 and S2 have been obtained, therefore, even if a foreground portion having no vertical correlation in brightnsss is imaged in a video screen, the output signal obtained by scanning an adjacent horizontal line is prevented from affecting the output signal obtained by scanning the present horizontal line. As a result, the generation of a color alias is prevented. The gains $\alpha$ and $\beta$ of the amplifiers contained in the gain control circuit 13, as stated before, were controlled so that, in the state wherein the entire hhite color image is picked up by the image sensor, the signals S1 and S2 may become zero. The reason for this is that the reproduction of false colors in the white-colored picture image in particular is prominent.

The operation circuit 19 is a circuit which is intended to obtain the signals R, G, and B necessary for composing color video signals by using the signals S1, S2, and S3. The operation coefficients in the operation circuit 19 are determined when the respective color signals outputted therefrom are SR, SG and SB, as follows.

The signals S1, S2 and S3 can be expressed, as follows using the expressions in formulae (1)–(7).

$$\begin{pmatrix} S1 \\ S2 \\ S3 \end{pmatrix} = \begin{pmatrix} 1 & -\alpha & 0 & 0 \\ 0 & 0 & 1 & -\beta \\ 1 & 1 & 1 & 1 \end{pmatrix} \begin{pmatrix} W_s \\ G_s \\ Y_s \\ C_s \end{pmatrix} \quad (10)$$

$$= \begin{pmatrix} 1 & -\alpha & 0 & 0 \\ 0 & 0 & 1 & -\beta \\ 1 & 1 & 1 & 1 \end{pmatrix} \begin{pmatrix} 1 & 1 & 1 \\ 0 & 1 & 0 \\ 1 & 1 & 0 \\ 0 & 1 & 1 \end{pmatrix} \begin{pmatrix} R \\ G \\ B \end{pmatrix}$$

Assume now that M is defined as follows.

$$M = \begin{pmatrix} 1 & -\alpha & 0 & 0 \\ 0 & 0 & 1 & -\beta \\ 1 & 1 & 1 & 1 \end{pmatrix} \begin{pmatrix} 1 & 1 & 1 \\ 0 & 1 & 0 \\ 1 & 1 & 0 \\ 0 & 1 & 1 \end{pmatrix} \quad (11)$$

$$= \begin{pmatrix} 1 & 1-\alpha & 1 \\ 1 & 1-\beta & -\beta \\ 2 & 4 & 2 \end{pmatrix}$$

Then, the signal amounts SR, SG, and SB of the signals R, G, and B are expressed with the use of the inverse matrix, as follows.

$$\begin{pmatrix} SR \\ SG \\ SB \end{pmatrix} = M^{-1} \begin{pmatrix} S1 \\ S2 \\ S3 \end{pmatrix} \quad (12)$$

$$M^{-1} = \begin{pmatrix} \frac{1}{1+\alpha} & \frac{1}{1+\beta} & \frac{\alpha\beta-1}{2(1+\alpha)(1+\beta)} \\ -\frac{1}{1+\alpha} & 0 & \frac{1}{2(1+\alpha)} \\ \frac{1}{1+\alpha} & -\frac{1}{1+\beta} & \frac{\alpha-\beta}{2(1+\alpha)(1+\beta)} \end{pmatrix}$$

Accordingly, by setting into the operation circuit 19 the operation coefficients shown in the formula (12) above, it is possible to obtain the signals R, G and B necessary for composing the color video signals. The signals SR, SG, and SB which have been composed through the calculation made in the operation circuit 19 are inputted into an encoder 20 and thus become color video signals of standard format.

In the above-mentioned signal processing operation, where the white color image is pick up by the image sensor, S1=S2=0 even when a difference exists between the nth line add the (n+1)th line in respect of brightness level. Accordingly, in this case, each of the signals SR, SG, and SB is prepared from the signal S3 in the following form.

$$\begin{pmatrix} SR \\ SG \\ SB \end{pmatrix} = \begin{pmatrix} \frac{\alpha\beta-1}{2(1+\alpha)(1+\beta)} S3 \\ \frac{1}{2(1+\alpha)} S3 \\ \frac{\alpha-\beta}{2(1+\alpha)(1+\beta)} S3 \end{pmatrix} \quad (13)$$

The respective coefficients of the signals S3 in the above formula (13) are intended to make the ratio between the signals SR, SG, and SB 1:1:1 under the state of white balance.

Further, as is obvious from the formula (13), if the respective coefficients of the signals S3 are set to 1, the ratio between the signals SR, SG, and SB is 1:1:1. Therefore, in the formula (12), when the respective coefficients of the signals S3 are set to 1 and the other coefficients are normalized according to the signals S3, the white balance can be obtained in a balanced state.

In this case, the signal amounts of SR, SG, and SB of respective signals R, G and B are shown in the following formula (14).

$$\begin{pmatrix} SR \\ SG \\ SB \end{pmatrix} = M^{-} \begin{pmatrix} S1 \\ S2 \\ S3 \end{pmatrix} \quad (14)$$

$$M^{-1} = \begin{pmatrix} \frac{2(1+\alpha)(1+\beta)}{(1+\alpha)(\alpha\beta-1)} & \frac{2(1+\alpha)(1+\beta)}{(1+\beta)(\alpha\beta-1)} & 1 \\ -2 & 0 & 1 \\ \frac{2(1+\alpha)(1+\beta)}{(1+\alpha)(\alpha-\beta)} & -\frac{2(1+\alpha)(1+\beta)}{(1+\beta)(\alpha-\beta)} & 1 \end{pmatrix}$$

In the present invention, as long as the color of a foreground subject is white, the requirement of S1=S2=0 is satisfied. Therefore, the formula of SR:SG:SB=1:1:1 is established even when a difference exists between the portions of the foreground as vertically viewed in respect of brightness level. The color of the reproduced foreground portion is white and it is not possible for any false signal to be generated. That is, at the stage where the output signals SR, SG and SB have been obtained from the operation circuit 19, a good state of white balance is already obtained.

Usually, a final hue adjustment in the camera is performed by photographing a standard color chart such as, for example, a color bar chart in advance and viewing a color monitor. This adjustment is performed by adjusting the signal amounts of the signals Y, R and B inputted into the encoder, through the operation between these signals Y, R and B. In the prior art color signal processing circuit, however, in some cases when the hue adjustment is performed, since the signal ratios between signals Y, R and B are changed, the white balance is lost. Therefore, the white balance adjustment is again required. As a result, the adjustment is complicated and the width of adjustment latitude is small.

In contrast, according to the present invention, the hue correction is achieved at the same time as the color separation by the coefficients of S1, S2 in the $M^{-1}$ of formula (12), which are changed. In this case, the width of adjustment for the color signal is large and the adjustment can be performed independently corresponding to eahh color signal. Further, since the formula S1=S2=0 has been obtained for the foreground, the hue correction can be provided iddependent of the white being balanced.

Accordingly, the latitude with which the hue adjustment can be performed is made wider. Thus, the present invention can contribute to obtaining a video image having good reproduced colors.

The standard color television signal is made by using the above-mentioned R, G and B signals. However, when the number of picture elements in the horizontal direction of the solid-state image sensor becomes small, the resolution in the horizontal direction may be insufficient. In this case, R, G, B and Y signals are produced by using an output signal which is obtained from every other picture element in the horizontal direction. The resolution in the horizontal direction is thereby improved by the output from the solid-state image sensor. The resolution is improved, when R, G and B signals obtained from the invention system are used as the chrominance signal, and when the output signal from the solid-state image sensor is used, as it is, as the luminance signal.

The solid-state color image sensor and color filter which are used in the present invention are not limited to those which have been used in the above-mentioned embodiment.

Figure 3:
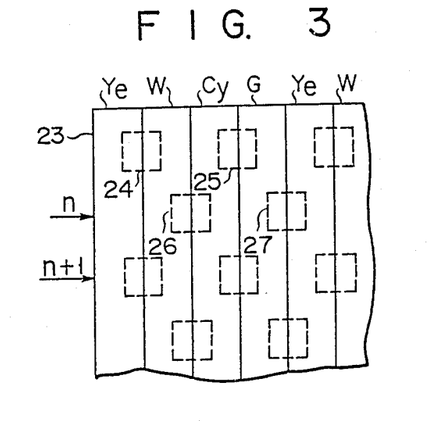
FIG. 3 shows another example of the solid-state color image sensor and color filter array used in the present invention.

In the above-mentioned embodiment, the solid-state color image sensor wherein its picture element and the filter portion of its color filter array are 1:1 was explained. However, the arrangement of the picture elements may be of the type wherein, as shown in FIG. 3 by broken lines, one picture element in one horizontal line is shifted 180° from its corresponding picture element in an adjacent horizontal line. In this case, the color filter 23 is such that strip-like filter portions Ye, W, Cy and G are repeatedly arranged side by side in the horizontal direction.

In this type of color picture image sensing means as well, the operation processing is carried out by using the output signals of 2×2 picture elements as the operation units, i.e., horizontal two picture elements and vertical two picture elements. In this type of color picture image sensing means, the output signal of, for example, the picture element 24 is a composite signal of the signals sensitive to the lights passed through the filter portions (Ye) and (W). The output signal of the picture element 25 is a composite signal of the signals sensitive to the lights passed through the filter portions (Cy) and (G). The output signal of the picture element 26 is a composite signal of the signals sensitive to the lights passed through the filter portions (W) and (Cy). Further, the output signal of the picture element 27 is a composite signal of the signals sensitive to the lights passed through the filter portions (G) and (Ye). The output signals of these picture elements 24, 25, 26 and 27, in combination, are used as the basic operation units, whereby the processing of the operation involved is carried out. Where said color picture image sensing means is used, a good horizontal resolution is obtained. Since the strip-like color filter portions are arranged in the form of a stripe, manufacture of the filter is easy.

Figure 4A:
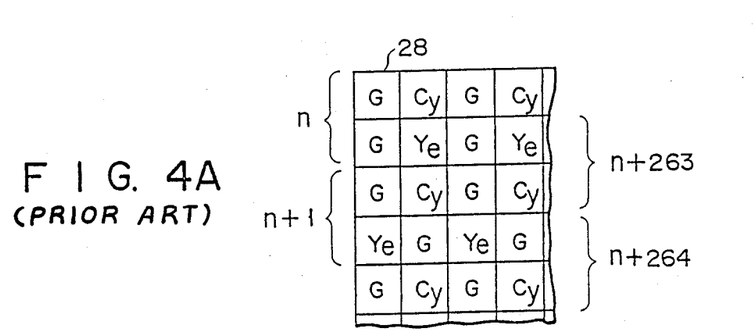
FIGS. 4A and 4B show other examples of the solid-state color image sensor and color flter array used in the present invention, respectively.
Figure 4B:
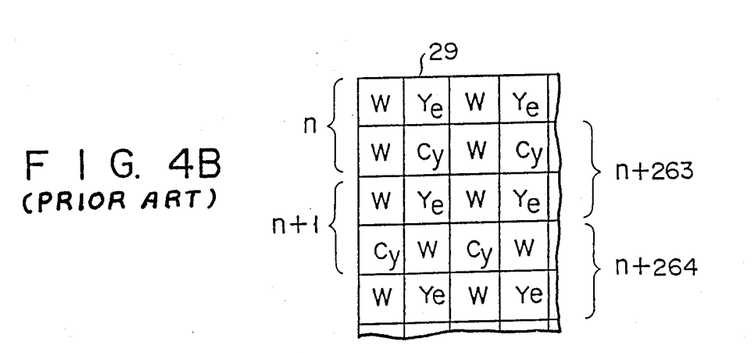

In the above example, the operation processing was carried out by using the output signals of 2×2 picture elements as the basic operation units, i.e., horizontal two picture elements and vertical two picture elements. However, the operation processing can also be performed by using as the basic operation units the output signals of 2×4 picture elements. In this case, color filters 28 and 29 which are shown in FIGS. 4A and 4B are used.

According to the image sensor having the color filter 28 or 29, output signals from two picture elements (divided into high and low signals adjacent to one another) are added and read out as horizontal signals, and the combination of the picture elements, to be interlaced, is changed in each field.

Where the image sensor which uses the color filter 28 or 29 is used with respect to an odd field, the information in the nth line, the (n+1)th line—are read out as shown and, with respect to an even field, the information in the (n+263)th line, the (n+264)th line —are read out as shown. Therefore, the cyclic period in which the information of the picture elements in this image sensor is read out is ½ of the cyclic period in which the information of the picture elements in the image sensor having the filter array of FIG. 2 is read out. Accordingly, in the case of this color image sensing means, the time period in which the information of each picture element is accumulated is ½ of the time period required in the case of the image sensor described in the preceding first embodiment (FIG. 1). In this color image sensing means, therefore offers the advantage that the residual images are lessened.

The color image sensor used in the present invention is not limited to the type which has been used in the preceding first embodiment. That is to say, the technical concept of the present invention is not limited to the above-mentioned method whereby the output signals are drawn out from the picture elements and the above-mentioned method whereby such signals are gain-controlled.

Figure 5:
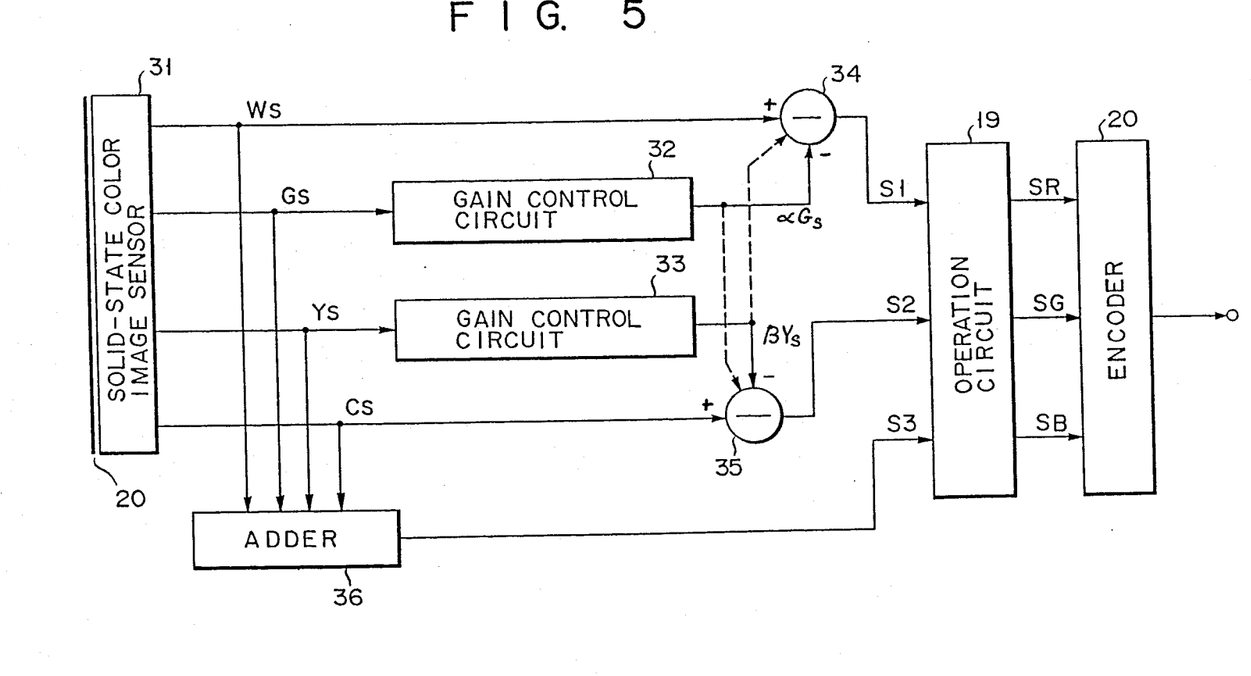
FIG. 5 shows the construction of a solid-state color imaging apparatus according t another embodiment of the present invention.

FIG. 5 shows another embodiment of the present invention. In FIG. 5, the same parts or sections as those which appear in FIG. 1 are denoted by like reference numerals. The solid-state color image sensor 31 used in this second embodiment is one which is capable of reading out the output signals of picture elements corresponding to four picture elements (two horizontal picture elements and two vertical picture elements), through four lines, simultaneously. Accordingly, tee use of this type of image sensor eliminates the necessity of providing the sample and hold means and synchronizing means provided in FIG. 1. By composing the signals (Ws, Gs, Ys and Cs) read out from the image sensor 31 having the color filter array shown in FIG. 2 through the operation of an adder 36, the signal S3 is obtained. Further, if the signal Gs is gain-controlled in a gain control circuit 32 and the operation of $(Ws - \alpha Gs)$ is performed in a subtractor 34, the signal S1 will be obtained. Further, if the signal Ys is gain-controlled and the arithmetic operation of $(Ys - \beta Cs)$ is carried out in a subtractor 35, then the signal S2 will be obtained. That is, in the subtractors 34 and 35, the operations in the above-mentioned formulae (6) and (7) are performed. It should be noted here that the gains $\alpha$ and $\beta$ of the gain control circuit 32 are previously controlled so that S1=S2=0 under the condition wherein a white-colored foreground portion is picked up by the image sensor over the entire screen of the image sensor.

In the foregoing description, when subtraction is performed, the output signals of two horizontally adjacent picture elements were used as one set of signals. This indicates that, for example under the condition wherein the white-colored foreground portion is entirely picked up by the image sensor, generation of color alias is prevented even when a great difference in brightness exists between the vertical portions of the video image.

The present invention is not limited to said combination of operational factors (output signals of picture elements). That is, as shown in FIG. 5 by broken lines, the output signal of the gain control circuit 33 is inputted into the subtractor 34 and the output signal of the gain control circuit 32 is inputted into the subtractor 35, as another combination. In this case as well, the gain of each gain control circuit 33 or 32 is so controlled that S1=S2=0 under the condition wherein the white colored foreground portion is entirely picked up by the image sensor. When the operational factors are combined in that way, the following operations are performed. Namely, $$S1 = Ws - \alpha' Ys$$

$$S2 = Cs - \beta' Gs, \text{ and}$$

$$S3 = Ws - Ys - Cs - Gs$$

Since the operational factors for obtaining the difference signals S1, S2 and S3 are the output signals of the picture elements as vertically arranged, the generation of color alias is lessened even when a great difference in brightness exists between the horizontal portions of the video image. That is, the color alias which may appear at the vertical edge portions of a reproduced picture image can be decreased. Further, when a difference signal is obtained by using the signals corresponded to the picture elements on the diagonal line, the color alias in the inclined direction can be eliminated.

The type of output signal of the present invention is not limited to said standard color TV signal. That is, the type of output signal may be transformed according to the apparatus which needs the outuut signal of the color image system. R, G, B signals are used as they are, for example, when a monitor television set has terminals that can be input R, G and B signals. Further, when a magnetic recording reproducing apparatus needs the output signal of the color image system, the preferred type of output signal is the chrominance and luminance signal.

As stated above, according to the present invention, the false signals which may be generated from the edges of a foreground portion as viewed in a specified direction can be lessened in accordance with the method of combination of the two difference signals. Further, the degradation in the detection characteristic of the detector conventionally used in the signal processing of such things as the frequency separation process, can be covered by the high linearity of the signal separation circuit, whereby the color displacements when the image is low in illumination are improved. Further, hue corrections can be individually performed according to each color signal without disturbing the white balance.

Further, in the case of the on-wafer filter wherein color filters are directly formed on the solid-state image sensor, it is generally known that the lens-like effect is produced due to the variation in shape of its surface with the result that a balanced signal, from the respective picture elements, is lost. This phenomenon is also prevented from occurring, at the stage where the difference signals are gain-controlled. As a result, a picture signal of good quality can be obtained. As stated above, the present invettion can solve the problems which are inherent in the prior art and contribute to obtaining a high grade of reproduced color picture images.

What is claimed is:

1. A color solid-state imaging apparatus comprising:
   color solid-state image sensor means, including a color filter, for producing a color image output signal which includes alternate first and second color scanning line signals, said first color scnnning line signal comprising alternate first and second color pixel signals, and said second color scanning line signal comprising alternate third and fourth color pixel signals; and
   color signal processing means for producing first and second difference signals from said color image output signal, said color signal processing means including:
   (a) color pixel signal separating means, coupled to said color solid-state image sensor means, for separating the two types of color pixel signals in each of said first and second color scanning line signals from one another to produce first and second color signals which correspond to said first and second color pixel signals, respectively, when said color solid-state image sensor means is producing said first color scanning line signal, and to produce first and second color signals which correspond to said third and fourth color pixel signals, respectively, when said color solid-state image sensor means is producing said second color scanning line signal;
   (b) gain control means, coupled to said color pixel signal separating means, for respectively adjusting the levels of said first and second color signals by predetermined amounts, said predetermined amounts being such as to produce a zero difference between said level-adjusted first and second color signals when said color solid-state image sensor means picks up a subject of a predetermined color; and
   (c) subtracting means, coupled to said gain control means, for producing a difference signal representing the difference between said level-adjusted first and second color signals, said difference signal being produced as said first difference signal when said color solid-state image sensor means is producing said first color scanning line signal, and being produced as said second difference signal when said color solid-state image sensor means is producing said second color scanning line signal.

2. A color solid-state imaging apparatus according to claim 19, wherein said color pixel signal separating means includes a signal separation circuit which sequentially samples the two types of color pixel signalsiin a color scanning line signal and which produces said sampled color pixel signals as said first and second color signals; wherein said gain control means includes level control means for adjusting the levels of said first and second color signals produced by said signal separation circuit to produce first and second level-adjusted color signals; and wherein said subtracting means inlcudes a subtracter which produces said difference signal as the difference between the levels of said first and second level-adjusted color signals;
   said color signal processing means further including:
   (d) delay means for delaying said difference signal produced by said subtractor for an interval corresponding to the period of said first and second color scanning line signals such that said delayed difference signal is produced as said second difference signal when said difference signal is produced as said first difference signal, and such that said delayed difference signal is produced as said first difference signal when said difference signal is produced as said second difference signal; and
   (e) switch means which has first and second output terminals for outputting said first and second difference signals, respectively, and which is arranged to alternately switch said first output terminal between said delayed difference signal and said difference signal and to alternately switch said second output terminal between said difference signal and said delayed difference signal at intervals corresponding to said period of said first and second color scanning line signals to thereby simultaneously produce said first and second difference signals at said first and second output terminals, respectively.

3. A color solid-state imaging apparatus according to claim 1, furthe comprising:
   first adding means for producing a fundamental signal by adding together either said first and second color scanning line signals or said first and second color signals produced by said color pixel signal separating means; and
   operation means for producing three primary color signals (R, G, and B) which is coupled to said color signal processing means and to said first adding means in order to receive said first and second difference signals and said fundamental signal.

4. A color solid-state imaging apparatus according to claim 3, wherein said first adding means includes a delay means for delaying said color image output signal produced by said color solid-state image sensor means for an interval corresponding to the period of said first and second color scanning line signals such that said delay means outputs said first color scanning line signal when said color solid-state image sensor means outputs said second color scanning line signal and such that said delay means outputs said second color scanning line signal when said color solid-state image sensor means outputs said first color scanning line signal; and first adder means for adding together the output of said delay means and the output of said color solid-state image sensor means.

5. A color solid-state imaging apparatus according to claim 3, wherein said first adding means includes first adder means for adding together said first and second color signals poduced by said color pixel signal separating means.

6. A color solid-state imaging apparttus according to claim 1, wherein said color filter comprises a plurality of groups of color filter portions successively arranged in a horizontal direction, wherein each of said groups comprises four consecutive vertical stripe color filter portions each having a different spectral characteristic.

7. A color solid-state imaging apparatus according to claim 1 wherein said subject of a predetermined color is a white subject.

8. A color solid-state imaging apparatus comprising:
   color solid-state image sensor means, including a color filter, for simultaneously producing first, second, third and fourth color signals; and
   color signal processing means for producing first and second difference signals from said color signals, said color signal processing means including:
   (a) gain control means, coupled to receive said second and third color signals, for respectively adjusting the levels of said second and third color signals by predetermined amounts, said predetermined amounts being such as to produce a zero difference between said first color signal and said level-adjusted second color signal and between said fourth color signal and said level-adjusted third color signal when a subject of a predetermined color is picked up by said color solid-state image sensor means;
   (b) a first subtracter having a first input section for receiving said first color signal and a second input section for receiving said level-adjusted second color signal; and
   (c) a second subtracter having a first input section for receiving said fourth color signal and a second input section for receiving said level-adjusted third color signal;
   wherein outputs of said first and second subtracters are produced as said first and second difference signals, respectively;
   said apparatus further comprising adding means for producing a fundamental signal by adding together said first, second, third and fourth color signals simultaneously produced by said color solid-state image sensor means.

* * * * *